(12) United States Patent
Oh et al.

(10) Patent No.: US 11,397,871 B2
(45) Date of Patent: Jul. 26, 2022

(54) ARTIFICIAL INTELLIGENCE MOVING AGENT

(71) Applicant: LG ELECTRONICS INC., Seoul (KR)

(72) Inventors: Seungkyun Oh, Seoul (KR); Sanghoon Kim, Seoul (KR); Jinseok Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 16/563,531

(22) Filed: Sep. 6, 2019

(65) Prior Publication Data

US 2019/0392254 A1 Dec. 26, 2019

(30) Foreign Application Priority Data

Aug. 16, 2019 (KR) .................. 10-2019-0100577

(51) Int. Cl.
| | | |
|---|---|---|
| *G06K 9/62* | (2022.01) | |
| *B25J 9/16* | (2006.01) | |
| *G06N 3/08* | (2006.01) | |
| *G06N 3/04* | (2006.01) | |
| *B25J 11/00* | (2006.01) | |
| *G06V 10/40* | (2022.01) | |

(52) U.S. Cl.
CPC ............ *G06K 9/6254* (2013.01); *B25J 9/163* (2013.01); *B25J 11/0085* (2013.01); *G06K 9/6257* (2013.01); *G06K 9/6263* (2013.01); *G06N 3/04* (2013.01); *G06N 3/08* (2013.01); *G06V 10/40* (2022.01)

(58) Field of Classification Search
CPC ...... G06K 9/6254; G06K 9/46; G06K 9/6257; G06K 9/6263; B25J 9/163; B25J 11/0085; G06N 3/04; G06N 3/08
See application file for complete search history.

(56) References Cited

U.S. PATENT DOCUMENTS

| | | | |
|---|---|---|---|
| 2017/0103341 A1 | | 4/2017 | Parthasarathy et al. |
| 2019/0066268 A1* | | 2/2019 | Song .................... G06N 3/0454 |
| 2019/0197396 A1* | | 6/2019 | Rajkumar ................ G06N 3/08 |

(Continued)

FOREIGN PATENT DOCUMENTS

| | | |
|---|---|---|
| KR | 101818074 | 1/2018 |
| KR | 20180075546 | 7/2018 |

(Continued)

OTHER PUBLICATIONS

Korean Intellectual Property Office Application Serial No. 10-2019-0100577, Office Action dated Aug. 16, 2019, 39 pages.

*Primary Examiner* — Qun Shen
(74) *Attorney, Agent, or Firm* — Lee Hong Degerman Kang & Waimey

(57) ABSTRACT

An artificial intelligence moving agent is provided. The artificial intelligence moving agent includes: a camera configured to photograph an image, and a processor configured to photograph an object, acquire type information of the object by providing an image of the photographed object to an artificial intelligence model, acquire correction type information designated by a user with respect to the image of the photographed object, and train the artificial intelligence model by using the correction type information.

8 Claims, 14 Drawing Sheets

(56) References Cited

U.S. PATENT DOCUMENTS

| | | | |
|---|---|---|---|
| 2019/0279345 A1* | 9/2019 | Kim | G06K 9/6256 |
| 2019/0295827 A1* | 9/2019 | Oh | G05B 19/4155 |
| 2020/0042796 A1 | 2/2020 | Kim et al. | |
| 2020/0174489 A1* | 6/2020 | Jung | G06K 9/00664 |
| 2021/0027103 A1* | 1/2021 | Brower | G06V 10/22 |

FOREIGN PATENT DOCUMENTS

| | | |
|---|---|---|
| KR | 1020190016333 | 2/2019 |
| KR | 20190094133 | 8/2019 |

\* cited by examiner

FIG. 4A
(a)
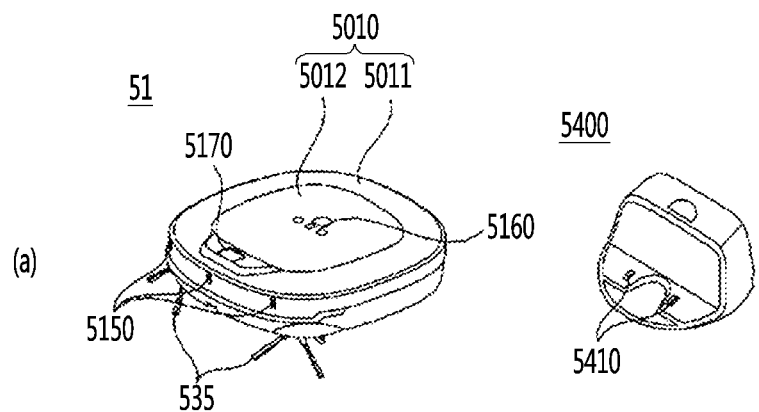
(b)
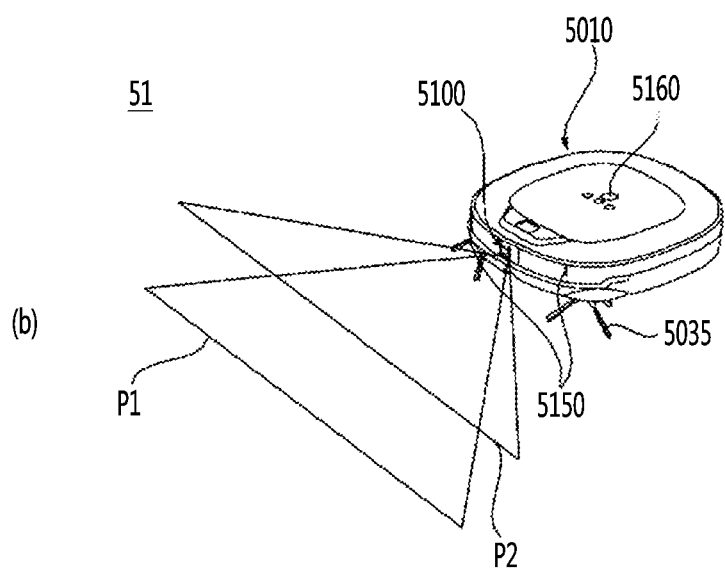

FIG. 4B
(a)
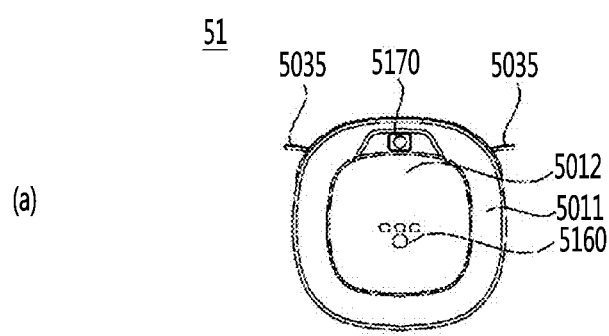
(b)
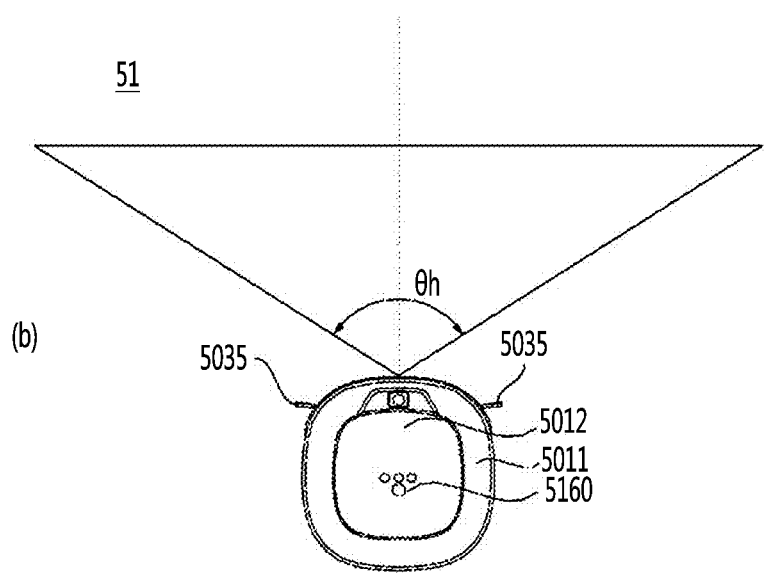

FIG. 4C
(a) 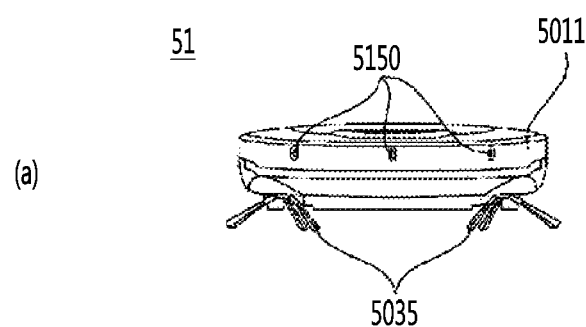
(b) 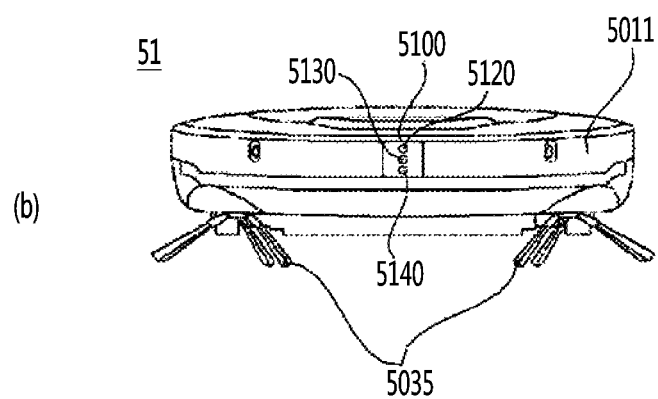

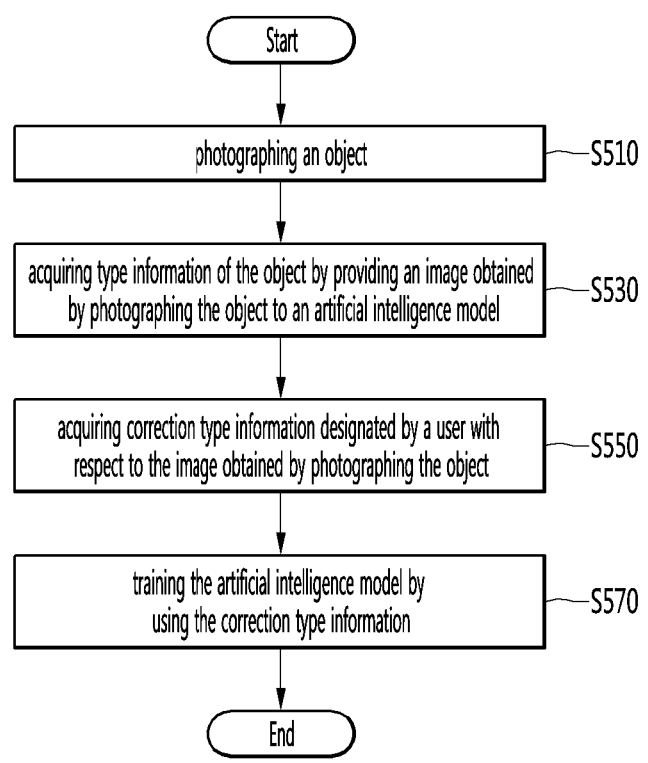

FIG. 11
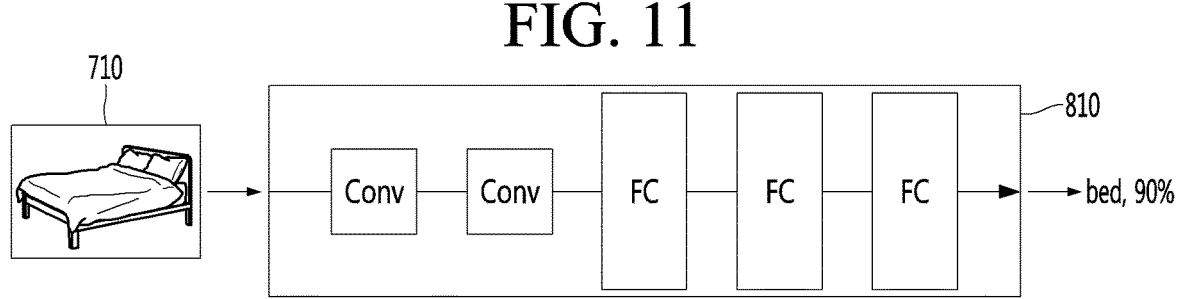
(a)
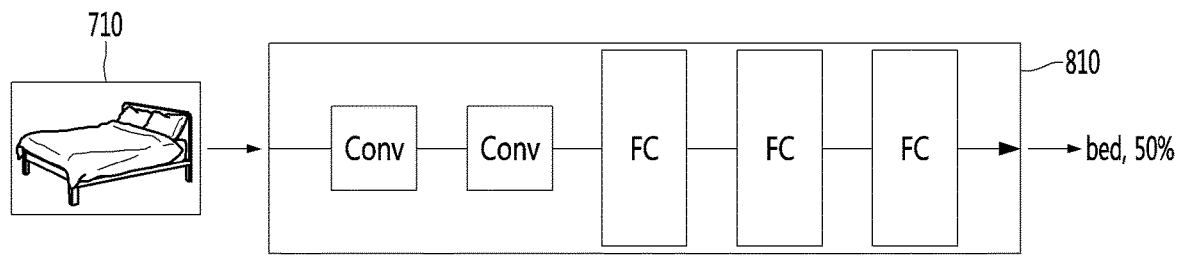
(b)
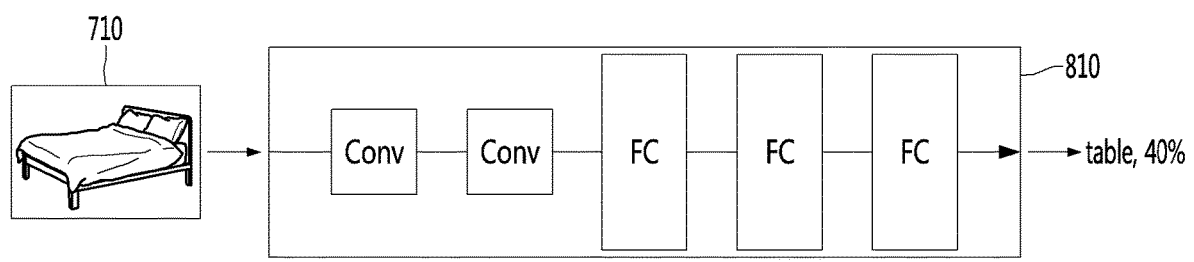
(c)

ARTIFICIAL INTELLIGENCE MOVING AGENT

CROSS-REFERENCE TO RELATED APPLICATIONS

Pursuant to 35 U.S.C. § 119(a), this application claims the benefit of earlier filing date and right of priority to Korean Patent Application No. 10-2019-0100577, filed on Aug. 16, 2019, the contents of which are hereby incorporated by reference herein in its entirety.

BACKGROUND

The present disclosure relates to an artificial intelligence moving agent, which is a moving agent capable of object recognition, to train an artificial intelligence model performing the object recognition by using labeling data directly inputted by a user.

Artificial intelligence (AI) is one field of computer engineering and information technology for studying a method of enabling a computer to perform thinking, learning, and self-development that can be performed by human intelligence and may denote that a computer imitates an intelligent action of a human.

In addition, the artificial intelligence is directly or indirectly associated with other fields of computer engineering without being individually provided. Particularly, at present, in various fields of information technology, an attempt to introduce AI components and use the AI components in solving a problem of a corresponding field is being actively done.

Meanwhile, technologies have been actively studied to recognize and learn surrounding situations by using the artificial intelligence, and provide information desired by the user in a desired format or perform operations or functions desired by the user.

In addition, an electronic device for providing such various operations and functions may be referred to as an artificial intelligence device.

Meanwhile, recently, a robot cleaner in addition to an inherent cleaning function may recognize an object in a space using a mounted camera and may perform an additional function such as collision avoidance, optimal path setting, and crime prevention using the recognition result.

Recently, in order to improve performance of the object recognition, various objects have been recognized by using an artificial intelligence model generated using a deep learning algorithm.

The artificial intelligence model is released as a product after trained using various objects to set parameters. In addition, the robot cleaner equipped with the artificial intelligence model performs an object recognition function in an indoor space of the user. An object to learn in advance may be different from an object actually existing in the indoor space, and thus, the performance of the object recognition by the artificial intelligence model may be lowered.

SUMMARY

To solve the above problems, embodiments provides an artificial intelligence moving agent to train an artificial intelligence model performing the object recognition by using labeling data directly inputted by a user. The artificial intelligence moving agent according to one embodiment includes: a camera configured to photograph an image, and a processor configured to photograph an object, acquire type information of the object by providing an image of the photographed object to an artificial intelligence model, acquire correction type information designated by a user with respect to the image of the photographed object, and train the artificial intelligence model by using the correction type information. The details of one or more embodiments are set forth in the accompanying drawings and the description below. Other features will be apparent from the description and drawings, and from the claims.

BRIEF DESCRIPTION OF THE DRAWINGS

FIG. 4A is a perspective view of a robot cleaner according to an embodiment.

FIG. 4B illustrates a horizontal angle of view of the robot cleaner of FIG. 4A.

FIG. 4C is a front view of the robot cleaner of FIG. 4A.

FIG. 5 is a view describing a method of operating a moving agent 100 according to the embodiments.

FIG. 11 is a view describing a condition for transmitting the image obtained by photographing the object and type information of the object, according to the embodiments.

DETAILED DESCRIPTION OF THE EMBODIMENTS

Figure 1:
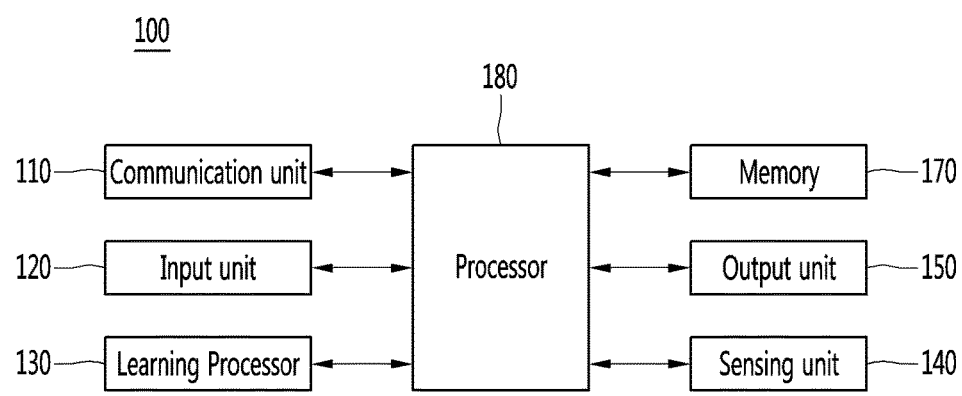
FIG. 1 illustrates an AI device 100 according to an embodiment.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
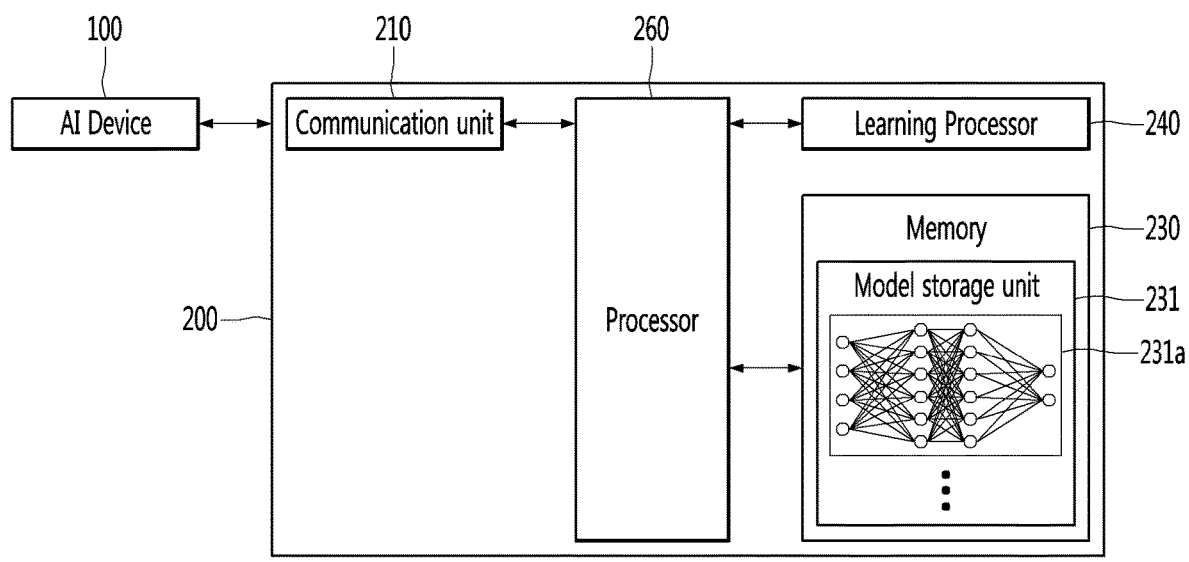
FIG. 2 illustrates an AI server 200 according to an embodiment.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
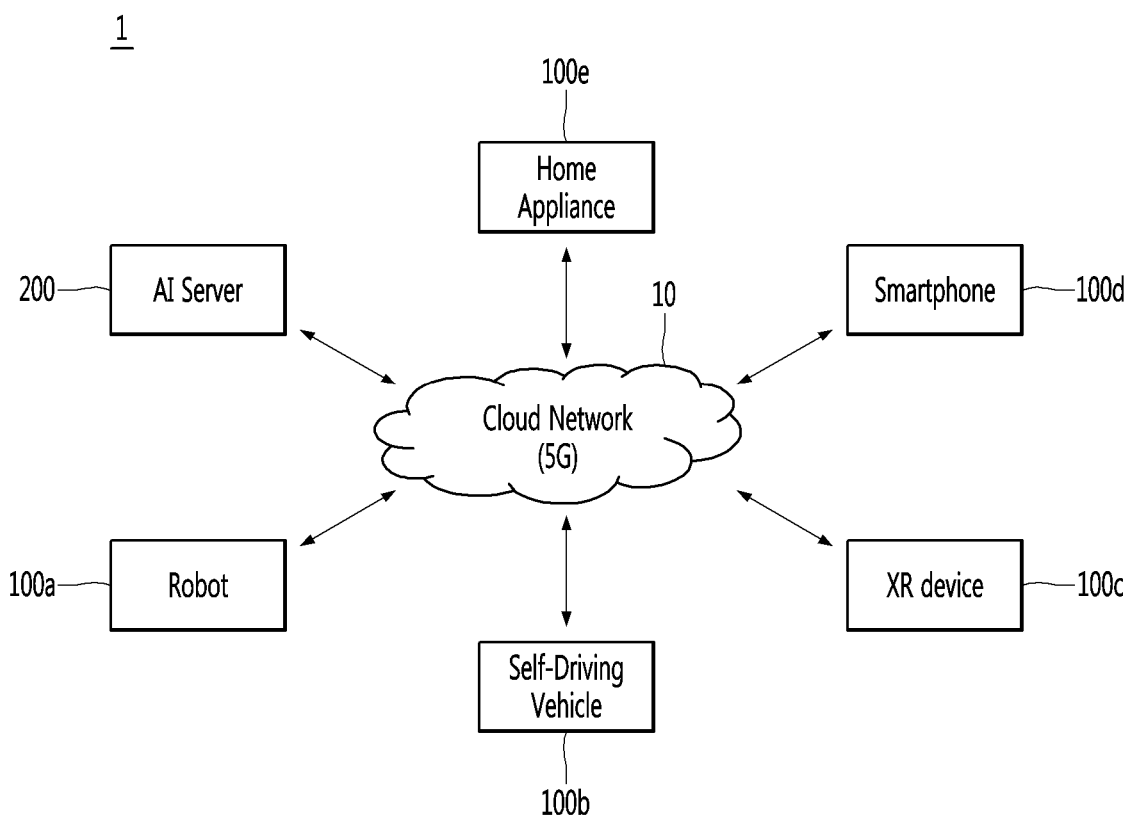
FIG. 3 illustrates an AI system 1 according to an embodiment.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4D:
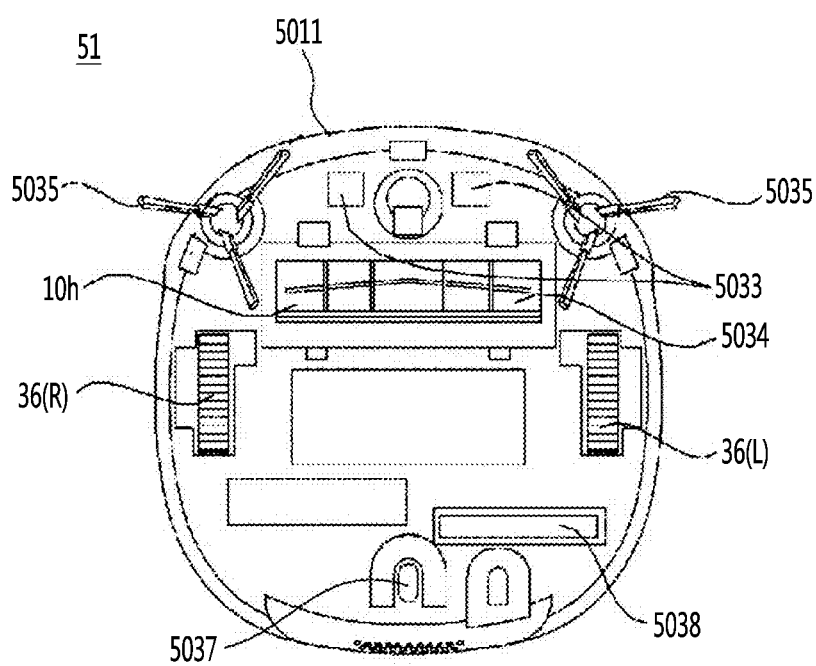
FIG. 4D illustrates a bottom surface of the robot cleaner of FIG. 4A.

FIG. 4A is a perspective view of a robot cleaner according to an embodiment of the present invention. FIG. 4B shows a horizontal angle of view of the robot cleaner of FIG. 4A. FIG. 4C is a front view of the robot cleaner of FIG. 4A. FIG. 4D shows the bottom of the robot cleaner of FIG. 4A.

Referring to FIGS. 4A to 4D, a robot cleaner 51 according to an embodiment of the present invention may include a body 5010 that moves along the floor of a cleaning area and sucks foreign substances such as dust on the floor, and an obstacle detection unit 5100 disposed on the front of the body 5010.

The body 5010 may include a casing 5011 that forms an outer surface and forms a space in which parts constituting the body 5010 are accommodated, a suction unit 5034 that is disposed in the casing 5011 and sucks foreign substances such as dust or trash, and a left wheel 36 (L) and a right wheel 36 (R), which are rotatably provided in the casing 5011, As the left wheel 36 (L) and the right wheel 36 (R) rotate, the body 5010 may move along the floor of the cleaning area, and suction foreign substances through the suction unit 5034 while moving.

The suction unit 5034 may include a suction fan (not shown) that generates a suction force and a suction port 10h through which air flow generated by the rotation of the suction fan is suctioned. The suction unit 5034 may include a filter (not shown) for collecting foreign substances in the air flow sucked through the suction port 10h and a foreign substance collecting box (not shown) in which foreign substances collected by the filter are accumulated.

In addition, the body 5010 may include a travel driving portion for driving the left wheel 36 (L) and the right wheel 36 (R). The travel driving portion may include at least one drive motor. The at least one drive motor may include a left wheel drive motor for rotating the left wheel 36 (L) and a right wheel drive motor for rotating the right wheel 36 (R).

The left and right wheel drive motor and the right wheel drive motor may be controlled to be operated independently by a drive control unit of the control unit so that the body 5010 may move straight, reverses, or turns. For example, when the body 5010 travels straight, the left wheel drive motor and the right wheel drive motor are rotated in the same direction. However, when the left wheel drive motor and the right wheel driving motor are rotated at different speeds or in opposite directions, the travel direction of the body 5010 may be changed. At least one auxiliary wheel 5037 for stably supporting the body 5010 may be further provided.

A plurality of brushes 5035, disposed on the front side of the bottom portion of the casing 5011 and each having a sweeper composed of a plurality of radially extending wings, may be further provided. By the rotation of the plurality of brushes 5035, dusts are removed from the floor of the cleaning area, and the dusts separated from the floor are sucked through the suction port 10h and gathered in the collecting box.

A control panel including an operation unit 5160 for receiving various commands for control of the robot cleaner 51 from the user may be provided on the upper surface of the casing 5011.

The obstacle detection unit 5100 may be disposed on the front of the body 5010.

The obstacle detection unit 5100 is fixed to the front of the casing 5011 and includes a first pattern projecting unit 5120, a second pattern projecting unit 5130, and an image acquiring unit 5140. In this case, the image acquiring unit is fundamentally installed below the pattern projecting unit as shown in FIC 4C, but may be disposed between the first and second pattern projecting units depending on cases. In addition, a second image acquiring unit (not shown) may be further provided at an upper end of the body. The second image acquiring unit may photograph an image of a portion above the body, that is, a ceiling.

The body 5010 is provided with a rechargeable battery 5038. A charging terminal 5033 of the battery 5038 is connected to a commercial power supply (for example, a power socket in a home) (not shown) or the body 5010 is docked on a separate charging stand (not shown) connected to the commercial power supply and the charging terminal 5033 is electrically connected to the commercial power supply, thus achieving charging of the battery 5038. Electric parts constituting the robot cleaner 51 may be supplied with power from the battery 5038 and therefore the robot cleaner 51 may travel by itself although being electrically separated from the commercial power supply in a state in which the battery 5038 is charged.

Figure 4E:
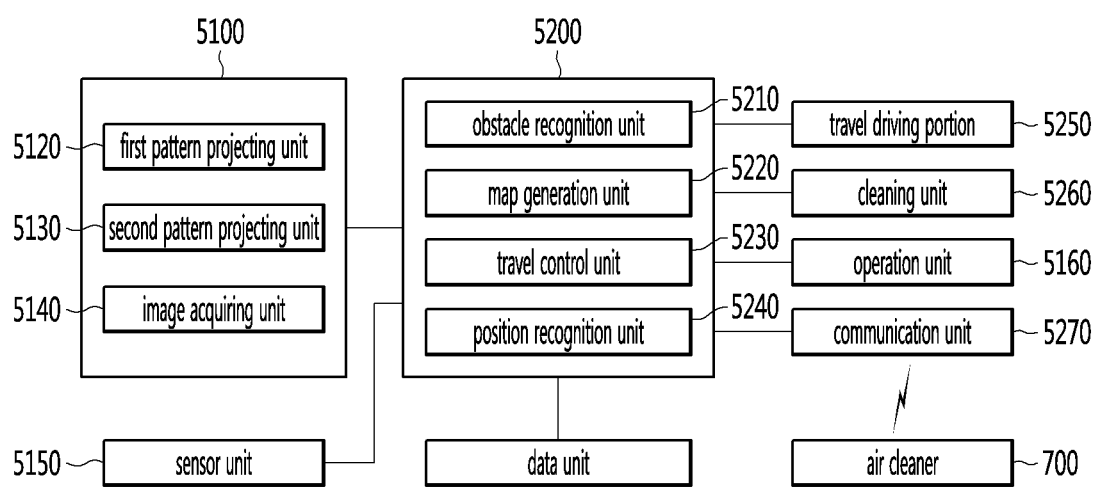
FIG. 4E is a block diagram illustrating a main parts of the robot cleaner according to an embodiment.

FIG. 4E is a block diagram illustrating the main parts of a robot cleaner according to an embodiment of the present invention.

As shown in FIG. 4E, the robot cleaner 51 includes a travel driving portion 5250, a cleaning unit 5260, a data unit 5280, an obstacle detection unit 5100, a sensor unit 5150, a communication unit 5270, an operation unit 5160, and a control unit 5200 that controls overall operation. The control unit may be implemented with one or more microprocessors, and may be implemented with a hardware device.

The operation unit 5160 includes input means such as at least one button, a switch, and a touch pad, and receives a user command. The operation unit may be provided at the upper end of the body 5010 as described above.

The data unit 5280 may store an obstacle detection signal input from the obstacle detection unit 5100 or the sensor unit 5150, store reference data used to determine an obstacle by an obstacle recognition unit 5210, and store obstacle information. Further, the data unit 5280 may store control data for controlling the operation of the robot cleaner, data related to a cleaning mode of the robot cleaner, and a map including the obstacle information generated by a map generation unit. The data unit 5280 may store a basic map, a cleaning map, a user map, and a guide map. The obstacle detection signal may include a sensing signal of ultrasonic wave/laser or the like by the sensor unit, and an acquisition image of the image acquiring unit.

In addition, the data unit 5280 may store data that is readable by a microprocessor, and may include a hard disk drive (HDD), a solid state disk (SSD), a silicon disk drive (SDD), a ROM, a RAM, a CD-ROM, magnetic tape, floppy disk, optical data storage, and the like.

The communication unit 5270 may communicate with the air cleaner in a wireless communication manner. In addition, the communication unit 5270 may be connected to an Internet network via a premises network and communicate with an external server or an air cleaner.

The communication unit 5270 may transmit a generated map to the air cleaner, and transmit data on an operation state or cleaning state of the robot cleaner to the air cleaner. The communication unit 5270 may include a communication module such as not only short-range wireless communication such as ZigBee and Bluetooth, but also Wi-Fi and WiBro to transmit and receive data.

The travel driving portion 5250 may include at least one drive motor, and allow the robot cleaner to travel according to a control command of a travel control unit 5230. As described above, the travel driving portion 5250 may include a left wheel drive motor for rotating the left wheel 36 (L) and a right wheel drive motor for rotating the right wheel 36 (R).

The cleaning unit 5260 may make dust or foreign substances around the robot cleaner easy to suck by operating the brush and operate a suction device to suck the dust or foreign substances. The cleaning unit 5260 may control the operation of a suction fan included in the suction unit 34 that sucks foreign substances such as dust or trash to allow the dust to be introduced into the foreign substance collecting box through the suction port.

The obstacle detection unit 5100 may include a first pattern projecting unit 5120, a second pattern projecting unit 5130, and an image acquiring unit 5140.

The sensor unit 5150 may include a plurality of sensors to assist in detecting an obstacle. The sensor unit 5150 may include at least one of a laser sensor, an ultrasonic sensor, and an infrared sensor. The sensor unit 5150 may detect an obstacle in front of the body 5010, that is, in the travel direction, using at least one of laser, ultrasound, and infrared rays. When the transmitted signal is reflected and incident, the sensor unit 5150 may input information on the presence or absence of an obstacle or a distance to an obstacle to the control unit 5200 as an obstacle detection signal.

In addition, the sensor unit 5150 may include at least one tilt sensor to sense a tilt of the body. The tilt sensor may calculate a tilt direction and an angle when being tilted in the front, rear, left, or right direction of the body. The tilt sensor may be an acceleration sensor, or the like. In the case of the acceleration sensor, any of a gyro type, an inertial type, and a silicon semiconductor type is applicable.

Meanwhile, the sensor unit 5150 may include at least one of the components of the obstacle detection unit 5100, and may perform the function of the obstacle detection unit 5100.

In the obstacle detection unit 5100, the first pattern projecting unit 5120, the second pattern projecting unit 5130 and the image acquiring unit 5140 are installed in the front of the robot cleaner, and light of first and second patterns P1 and P2 are projected in front of the robot cleaner and the light of the projected pattern is photographed to acquire an image.

The sensor unit 5150 may include a dust sensor for sensing the amount of dust in the air and a gas sensor for sensing the amount of gas in the air.

The obstacle detection unit 5100 may input the acquisition image to the control unit 5200 as an obstacle detection signal.

The first and second pattern projecting units 5120 and 5130 of the obstacle detection unit 5100 each may include a light source and an optical pattern projection element (OPPE) that generates a predetermined pattern by transmitting the light projected from a light source. The light source may be a laser diode (LD), a light emitting diode (LED), or the like. Laser light is superior to other light sources in monochromaticity, straightness and connection characteristics, and therefore precise distance measurement is possible. In particular, a laser diode is preferably used as the light source because infrared rays or visible rays have a problem in that deviation in the accuracy of distance measurement is largely generated depending on factors such as the color and material of an object, or the like. A pattern generator may include a lens and a diffractive optical element (DOE). Depending on the configuration of the pattern generator provided in each of the pattern projecting units 5120 and 5130, light of various patterns may be projected.

The first pattern projecting unit 5120 may project light of the first pattern P1 (hereinafter, referred to as first pattern light) toward the front lower side of the body 5010. Accordingly, the first pattern light P1 may be incident on the floor of the cleaning area.

The first pattern light P1 may be configured in the form of a horizontal line Ph. It is also possible that the first pattern light P1 is configured in the form of a cross pattern in which the horizontal line Ph and the vertical line Pv intersect each other.

The first pattern projecting unit 120, the second pattern projecting unit 5130, and the image acquiring unit 5140 may be vertically arranged in a line. The image acquiring unit 5140 is disposed on the lower side of the first pattern projecting unit 5120 and the second pattern projecting unit 5130, but the present invention is not limited thereto. The image acquiring unit 5140 may be disposed on an upper side of the first pattern projecting unit and the second pattern projecting unit.

In the embodiment, the first pattern projecting unit 5120 may be disposed on the upper side and may project the first pattern light P1 downward toward the front to detect an obstacle located below the first pattern projecting unit 5120. The second pattern projecting unit 5130 is positioned on the lower side of the first pattern projecting unit 5120 and may project light of a second pattern P2 (hereinafter referred to as second pattern light) upward toward the front. Therefore, the second pattern light P2 may be incident on a wall or an obstacle or a certain portion of the obstacle located higher than at least the second pattern projecting unit 5130 from the bottom of the cleaning area.

The second pattern light P2 may have a pattern different from that of the first pattern light P1, and preferably includes a horizontal line. Here, the horizontal line is not necessarily a continuous line, but may be a dotted line.

In FIG. 2 described above, a projection angle θh shown in FIG. 2 represents a horizontal projection angle of the first pattern light P1 projected from the first pattern projecting unit 5120. The projection angle θh is an angle between both ends of the horizontal line Ph and the first pattern projecting unit 5120, and is preferably set in the range of 130° to 140°, but is not limited thereto. The dotted line shown in FIG. 2 is directed toward the front of the robot cleaner 51, and the first pattern light P1 may be configured to be symmetrical with respect to the dotted line.

Similarly to the first pattern projecting unit 5120, with respect to the second pattern projecting unit 5130, a horizontal projection angle is preferably set in the range of 130° to 140°. According to an embodiment, the second pattern projecting unit 5130 may project the pattern light P2 at the same horizontal projection angle as that of the first pattern projecting unit 5120, and in this case, the second pattern light P2 may be configured to be symmetrical with respect to the dotted line shown in FIG.

The image acquiring unit 5140 may acquire an image in front of the main body 5010. Particularly, the pattern light P1 or P2 appears in an image acquired by the image acquiring unit 5140 (hereinafter, referred to as an acquisition image). Hereinafter, the image of the pattern light P1 or P2 is referred to a light pattern. Since the pattern light P1 or P2 incident on the actual space is substantially formed on the image sensor, the same reference numerals as the pattern lights P1 and P2 are assigned to the first pattern light P1 And the second pattern light P2 are referred to as a first light pattern P1 and a second light pattern P2, respectively.

The image acquiring unit 5140 may include a digital camera that converts an image of an object into an electrical signal and then converts the digital signal into a digital signal and stores the digital signal in a memory device. The digital camera includes an image sensor (not shown).

An image sensor is an apparatus for converting an optical image into an electrical signal. The image sensor is composed of a chip on which a plurality of photo diodes are integrated, and a photodiode is exemplified as a pixel. Charges are accumulated in the respective pixels by an image formed on the chip by the light passing through the lens, and the charges accumulated in the pixels are converted into an electrical signal (for example, voltage). As the image sensors, a Charge Coupled Device (CCD), a Complementary Metal Oxide Semiconductor (CMOS) and the like have been well known.

The image processing unit may generate a digital image based on an analog signal output from the image sensor. The image processing unit may include an AD converter that converts an analog signal into a digital signal, a buffer memory that temporarily stores digital information according to the digital signal output from the AD converter, and a digital signal processor (DSP) that processes information recorded on the buffer memory to configure a digital image.

The control unit 5200 may include an obstacle recognition unit 5210, a map generation unit 5220, a travel control unit 5230, and a position recognition unit 5240.

The obstacle recognition unit 5210 may determine an obstacle through the acquisition image input from the obstacle detection unit 5100, and the travel control unit 5230 may change a movement direction or a travel route in accordance with obstacle information, and allow the travel driving portion 5250 to travel while passing or avoiding the obstacle.

The travel control unit 5230 may control the travel driving portion 5250 by independently control the operations of the left wheel drive motor and the right wheel drive motor to allow the main body 5010 to travel straight or rotate.

The obstacle recognition unit 5210 may store an obstacle detection signal input from the sensor unit 5150 or the obstacle detection unit 5100 in the data unit 5280 and analyze the obstacle detection signal to determine an obstacle.

The obstacle recognition unit 5210 may determine whether or not there is an obstacle ahead based on a signal of the sensor unit, and analyzes the acquisition image to determine the position, size, and shape of the obstacle.

The obstacle recognition unit 5210 may analyze the acquisition image to extract a pattern. The obstacle recognition unit 5210 may extract a light pattern appearing when the pattern light projected from the first pattern projecting unit or the second pattern projecting unit is projected to the floor or the obstacle, and determine the obstacle based on the extracted light pattern.

The obstacle recognition unit 5210 may detect the light pattern P1 or P2 from the image (acquisition image) acquired by the image acquiring unit 5140. The obstacle recognition unit 5210 may detect features such as points, lines, and surfaces with respect to predetermined pixels constituting the acquisition image (feature detection), and detect the points, the lines, the surfaces, and the like constituting the light pattern P1 or the light pattern P2.

The obstacle recognition unit 5210 may extract line segments constituted by consecutive pixels brighter than the surrounding area and extract a horizontal line Ph constituting the first light pattern P1 and a horizontal line constituting the second light pattern P2. However, the present invention is not limited thereto. Various techniques for extracting a desired pattern from a digital image are already known. The obstacle recognition unit 5210 may extract the first light pattern P1 and the second light pattern p2 using the well-known techniques.

In addition, the obstacle recognition unit 5210 may determine the presence or absence of an obstacle based on the detected pattern, and determine a shape of the obstacle. The obstacle recognition unit 5210 may determine an obstacle through the first light pattern and the second light pattern, and may calculate a distance to the obstacle. In addition, the obstacle recognition unit 5210 may determine the size (height) and shape of the obstacle through the shapes of the first light pattern and the second light pattern and changes in the light patterns, which are caused in the case of approaching the obstacle.

The obstacle recognition unit 5210 may determine an obstacle based on distances between the first and second light patterns and a reference position. When the first light pattern P1 appears at a position lower than the reference position, the obstacle recognition unit 5210 may determine that the downhill ramp exists, and when the first light pattern P1 disappears, determine that a cliff exists. In addition, when the second light pattern appears, the obstacle recognition unit 5210 may determine an obstacle ahead or an obstacle above.

The obstacle recognition unit 5210 may determine whether the body is tilted based on the tilt information input from the tilt sensor of the sensor unit 5150, and when the body is tilted, compensate for the tilt with respect to a position of the light pattern of the acquisition image.

The travel control unit 5230 may control the travel driving portion 5250 so as to perform cleaning operation while traveling on a specified area of the cleaning area, and control the cleaning unit 5260 to perform cleaning by sucking the dust during traveling.

The travel control unit 5230 may determine whether traveling or entry is possible with respect to the obstacle recognized by the obstacle recognition unit 5210, and configure a travel route to approach the obstacle, pass the obstacle, or avoid the obstacle and then control the travel driving portion 5250.

The map generation unit 5220 may generate a map for the cleaning area based on information on the obstacle determined by the obstacle recognition unit 5210.

The map generation unit 5220 may generate a map for the cleaning area based on obstacle information while traveling on the cleaning area in the initial operation or when the map for the cleaning area is not stored. Further, the map generation unit 5220 may update the previously-generated map based on the obstacle information acquired during traveling.

The map generation unit 5220 may generate a basic map based on information acquired from the obstacle recognition unit 5210 during traveling, and generate a cleaning map by dividing an area from the basic map. Further, the map generation unit 5220 may arrange areas for the cleaning map and set attributes for the areas to generate a user map and a guide map.

The basic map is a map in which the shape of the cleaning area obtained through traveling is indicated by an outline, and the cleaning map is a map in which the area is divided on the basic map. The basic map and the cleaning map include a travelable area of the robot cleaner and obstacle information. The user map is a map obtained by simplifying the area of the cleaning map and cleaning up the shape of the outline, in which visual effects are added. The guide map is a map in which the cleaning map and the user map are superimposed. Since the cleaning map is displayed on the guide map, a cleaning command may be inputted based on the area where the robot cleaner is capable of actually traveling.

After generating the basic map, the map generation unit 5220 may divide the cleaning area into a plurality of areas, and generate a map including connection paths connecting the plurality of areas, and information on obstacles in each area. The map generation unit 5220 may divide a small area and set a representative area for area division on the map. Then the map generation unit 5220 may set the divided small as a separate sub-area and merge into the representative area to generate a map in which the areas are distinguished from one another.

The map generation unit 5220 processes the shape of the area for each of the divided areas. The map generation unit 5220 sets attributes for the divided areas, and processes the shape of the area according to the attribute for each area.

The map generation unit 5220 may first determine a main area based on the number of contacts with other areas among the areas. The main area may be basically a living room, but the main area may be changed to any one of a plurality of rooms in some cases. The map generation unit 5220 may set attributes for the remaining areas with the main area as reference. For example, the map generation unit 5220 may set an area of a predetermined size or more arranged with the living room (that is main area) as a center, as a room, and set the other areas as other areas.

The map generation unit 5220 may perform processing such that each area has a specific shape according to a criterion according to the attribute of the area in processing the shape of the area. For example, the map generation unit 5220 may process the shape of an area based on the shape of a room in a general home, for example, a square. The map generation unit 5220 may expand the shape of the area based on the outermost cell of the basic map and process the shape of the area by deleting or reducing the area with respect to the area that is not accessible due to the obstacle.

In addition, the map generation unit 5220 may display obstacles of a predetermined size or larger on the basic map in accordance with the size of the obstacle and delete obstacles smaller than the predetermined size from a relevant cell such that the obstacles are not displayed. For example, the map generation unit may display furniture such as a chair or sofa having a predetermined size or more on the map, and delete a temporary obstacle and a small size obstacle, such as a small toy from the map. The map generation unit 5220 may store the position of a charging stand on the map together when the map is generated.

The map generation unit 5220 may add an obstacle on the map based on the obstacle information input from the obstacle recognizing unit 21 with respect to the obstacle detected after the map is generated. The map generator 5220 may add an obstacle to the map when a specific obstacle is repeatedly detected at a fixed position, and ignores the obstacle when the obstacle is temporarily detected.

The map generation unit 5220 may generate both the user map which is a processed map, and the guide map which is displayed such the user map and the cleaning map are superimposed on each other.

When a virtual wall is set, the map generation unit 5220 may set the position of the virtual wall in the cleaning map based on data on the virtual wall received through the communication unit, and calculate the coordinates of the virtual wall corresponding to the cleaning area. The map generation unit 5220 may register the virtual wall as an obstacle in the cleaning map.

The map generation unit 5220 may store the data on the set virtual wall, for example, a level of the virtual wall, and information on the attribute of the virtual wall together.

The map generation unit 5220 may extend the set virtual wall and register it as an obstacle. During traveling, the virtual wall, set such that the body 5010 does not contact the virtual wall or does not invade the virtual wall, is expanded to be set to a wider range.

When a current position of the body 5010 cannot be determined by the position recognition unit 5240, the map generation unit 5220 may generate a new map for the cleaning area. The map generation unit 5220 may determine movement to a new area and initialize a preset virtual wall.

The map generation unit 5220 may additionally set a virtual wall in the map such that the body 5010 operates in response to the virtual wall when the body 5010 travels in a case where the data on the virtual wall is received while traveling For example, when a new virtual wall is added or a level or an attribute of a virtual wall is changed, or when the position of a preset virtual wall is changed, the map generation unit 5220 may update the map based on received data, reflect information on the changed virtual wall to the map.

The location recognition unit 5240 may determine the current position of the body 5010 based on the map (the cleaning map, the guide map, or the user map) stored in the data unit.

When a cleaning command is input, the position recognition unit 5240 may determine whether a position on the map matches the current position of the body. When the current position does not match the position on the map or when the current position is not able to be identified, the position recognition unit 5240 may recognize the current position and restore the current position of the robot cleaner 51. When the current position is restored, the travel control unit 5230 may allow the travel driving portion to move to a specified area based on the current position. The cleaning command may be input from a remote control (not shown), the operation unit 5160, or the air cleaner.

When the current position does not match the position on the map or the current position is not able to be identified, the position recognition unit 5240 may analyze the acquisition image inputted from the image acquiring nit 5140 and estimate the current position based on the map.

The position recognition unit 5240 may process the acquisition image obtained at each position during the map generation by the map generation unit 5220, and recognize a global position of the body in association with the map.

The position recognition unit 5240 may compare the map with the acquisition image for each position on the map by using the acquisition image of the image acquiring unit 5140 to figure out the current position of the body, thus estimating and recognizing the current position even when the position of the body is suddenly changed.

The position recognition unit 5240 may analyze various features included in the acquisition image, such as ceiling lights, edges, corners, blobs, ridges to determine a position. The acquisition image may be inputted from the image acquiring unit or a second image acquiring unit provided at an upper end of the body.

The position recognition unit 5240 may detect features from each of the acquisition images. Various methods for detecting features from an image (Feature Detection) are well known in the technical field of computer vision. Several feature detectors suitable for detecting these features have been known. For example, there are Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, Gray-level blobs detector and the like.

The position recognition unit 5240 may calculate a descriptor based on each of the features. The position recognition unit 5240 may convert the features into a descriptor using a Scale Invariant Feature Transform (SIFT) technique for feature detection. The descriptor may be denoted by an n-dimensional vector. The SIFT may detect invariant features for scale, rotation, and brightness change of a subject to be photographed. The invariant features (that is, Rotation-invariant) even though the same area is photographed with different postures of the robot cleaner 51 may be detected. Of course, various other techniques (e.g., Histogram of Oriented Gradient (HOG), Haar feature, Ferns, Local Binary Pattern (LBP), Modified Census Transform (MCT) may be applied without being limited thereto.

The position recognition unit 5240 may classify at least one descriptor for each acquisition image into a plurality of groups according to a predetermined sub-classification rule based on descriptor information obtained through the acquisition image of each position, and convert descriptors belonging to the same group into a sub-representative descriptor, respectively according to a predetermined sub-representative rule. As another example, it is also possible to classify all descriptors gathered from acquisition images in a predetermined area, such as a room, into a plurality of groups according to a predetermined sub-classification rule, and convert the descriptors belonging to the same group into a sub-representative descriptor according to the predetermined sub-representative rule.

The position recognition unit 5240 may obtain a feature distribution of each position through the above process. Each position feature distribution may be expressed by a histogram or an n-dimensional vector. As another example, a learning module 143 may estimate an unknown current position based on a descriptor calculated from each feature, without going through a predetermined sub-classification rule and a predetermined sub-representative rule.

Further, when the current position of the robot cleaner 51 is unknown due to a positional jump or the like, the position recognition unit 5240 may estimate a current position based on data such as the descriptor or the sub-representative descriptor previously stored.

The position recognition unit 5240 may obtain an acquisition image through the image acquiring unit 5140 at an unknown current position and when various features such as ceiling lights, edges, corners, blobs, ridges, and the like are identified through the image, detect features from the acquisition image.

The position recognition unit 5240 may perform conversion to a position (recognition feature sub-distribution) capable of being compared to position information (e.g., feature distribution of each position) to be compared according to a predetermined sub-conversion rule based on at least one recognition descriptor information obtained through the acquisition image of the unknown current position. According to a predetermined sub-comparison rule, each position feature distribution may be compared with each recognition feature distribution to calculate each similarity degree. The similarity degree (probability) for each position may be calculated corresponding to each position, and the position where the greatest probability is calculated may be determined as the current position.

When the map is updated by the map generation unit 5220 during traveling, the control unit 5200 may transmit the updated information to the air cleaner 700 through the communication unit, to allow the maps stored in the air cleaner and the robot cleaner 51 to be identical to each other.

When the cleaning command is input, the travel control unit 5230 may allow the travel driving portion to move to the specified area of the cleaning area and operate the cleaning unit to allow cleaning to be performed while traveling.

When a cleaning command for a plurality of areas is inputted, the travel control unit 5230 may move to an area according to whether a priority is set to the area or a specified order so that the cleaning is performed. When the order is not specified, the travel control unit 5230 may move to a near area or an adjacent area according to distances to perform cleaning.

In addition, when a cleaning command for an arbitrary area is inputted regardless of discrimination in the areas, the travel control unit 5230 may move to an area included in an arbitrary area and perform cleaning.

When a virtual wall is set, the travel control unit 5230 may identify the virtual wall based on the coordinate values inputted from the map generation unit 5220 and control the travel driving portion.

Even when the obstacle recognition unit 5210 determines that the obstacle does not exist, the travel control unit 5230 may recognize that the obstacle exists at the corresponding position and restrict the travel when the virtual wall is set.

When the settings of the virtual wall are changed during traveling, the travel control unit 5230 may reset a travel route by distinguishing the travelable area and the non-travelable area according to the changed virtual wall settings.

The travel control unit 5230 may control the travel in accordance with any one of setting 1 for noise, setting 2 for a travel route, setting 3 for avoidance, and setting 4 for security according to an attribute set on the virtual wall.

The travel control unit 5230 may move close to the virtual wall and perform a specified operation (traveling route, setting 2), reduce the noise occurring in the body and perform cleaning (noise, setting 1), travel while avoiding the virtual wall without moving to the virtual wall by a certain distance or more (avoidance, setting 3), or photograph an image of a predetermined area based on the virtual wall (security, setting 4), according to the attribute of the virtual wall.

The control unit 5200 may store a cleaning history on the data unit when the cleaning for the set specified area is completed.

In addition, the control unit 5200 may transmit the operation state or the cleaning state of the robot cleaner 51 to the air cleaner at predetermined intervals through the communication unit 190.

Based on the data received from the robot cleaner 51, the air cleaner may display a position of the robot cleaner together with the map on the screen of an application being executed, and also output information on the cleaning state.

When information on the obstacle is added, the air cleaner may update the map based on the received data.

When the cleaning command is input, the robot cleaner may travel by distinguishing the travelable area from the non-travelable area on the basis of the information on the set virtual wall.

Meanwhile, the sensor unit 5150 may include a camera. Further, the control unit 5200 may obtain an image of the indoor space by controlling the camera to photograph the indoor space.

Meanwhile, the sensor unit 5150 may include at least one of a laser sensor, an ultrasonic sensor, an infrared sensor, and a camera. The sensor unit 5150 may generate a map of the indoor space using at least one of laser, ultrasonic wave, infrared ray, and the image photographed through the camera.

Further, the sensor unit 5150 may include a temperature sensor for measuring a temperature of the indoor space, a first heat detection sensor (for example, an infrared sensor) for sensing a temperature of the user, and a second heat detection sensor for sensing an operation state of a gas range or an electric range, or heat information such as heat of an electronic product.

The sensor unit 5150 may also include a microphone for receiving sound.

The sensor unit 5150 may include a dust sensor for sensing the amount of dust in the air and a gas sensor for sensing the amount of gas in the air.

Hereinafter, the moving agent will be described. Meanwhile, the moving agent will be described as an example of the above-described robot cleaner, but the embodiments are not limited thereto. The moving agent may be any device, such as a pet robot or guide robot, capable of moving in an indoor space.

In addition, the moving agent may include the above-described AI device 100, a learning device 200, and the robot cleaner 51, and may perform corresponding functions thereof.

In addition, the term "AI device 100" may be used interchangeably with the term "moving agent 100". In addition, the term "moving agent 100" may be used interchangeably with the term "artificial intelligence moving agent 100".

FIG. 5 is a view describing a method of operating the moving agent 100 according to the embodiments.

The method of operating the moving agent 100 according to the embodiments may include photographing an object (S510); acquiring type information of the object by providing an image obtained by photographing the object to an artificial intelligence model (S530); acquiring correction type information designated by a user with respect to the image obtained by photographing the object (S550); and training the artificial intelligence model by using the correction type information (S570).

A method of generating the artificial intelligence model will be described prior to fully detailed descriptions of the embodiments.

Figure 6:
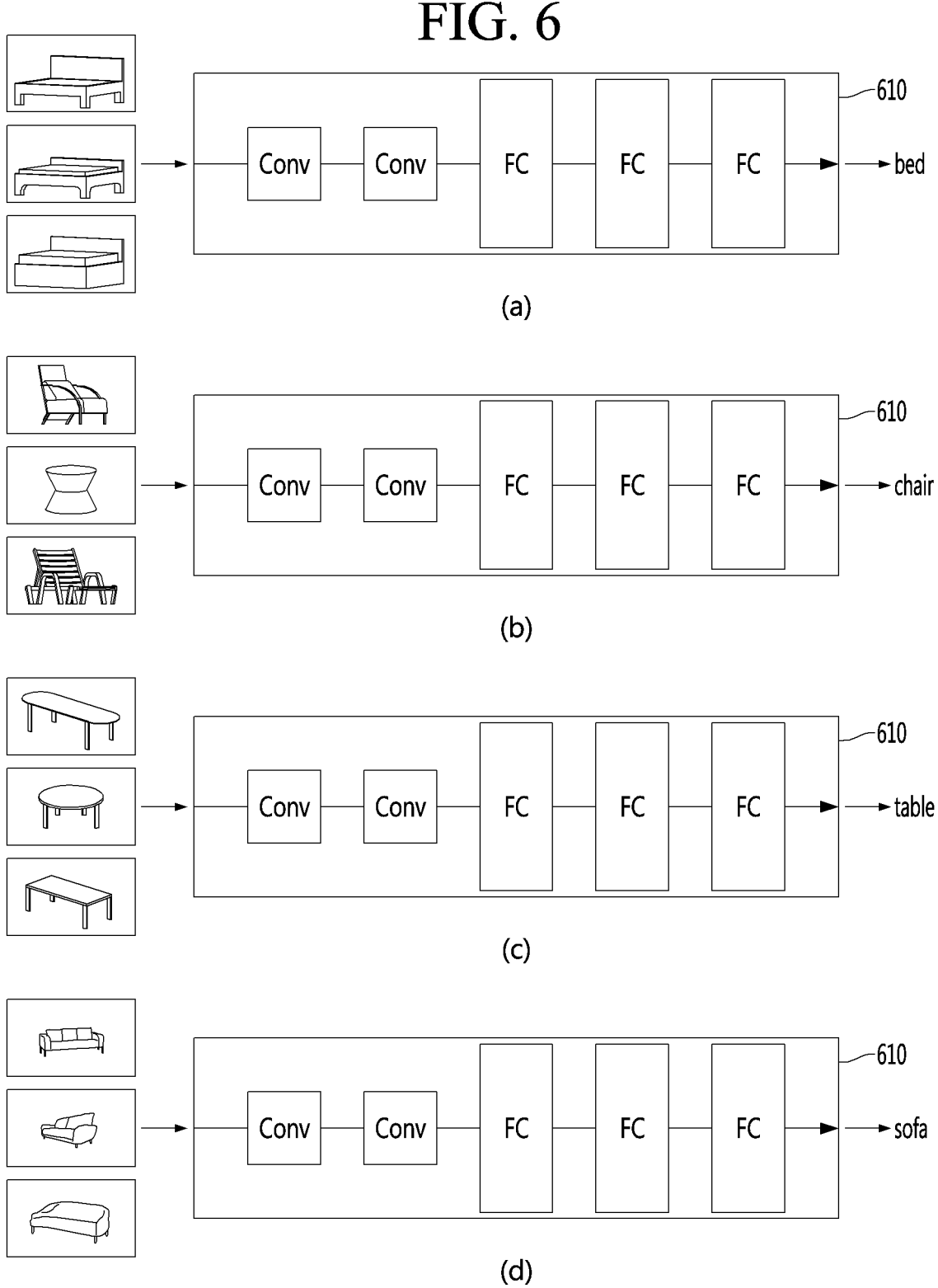
FIG. 6 is a view describing a method of generating an artificial intelligence model according to the embodiments.

FIG. 6 is a view describing a method of generating an artificial intelligence model according to the embodiments. First, an artificial intelligence will be described briefly.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

The artificial neural network has a structure specified by a model component, activation function, loss function or cost function, learning algorithm, optimization algorithm, and the like, and content may be specified by presetting hyperparameters before learning and then setting model parameters through the learning.

For example, a factor for determining the structure of the artificial neural network may include the number of hidden layers, the number of hidden nodes included in each of the hidden layers, an input feature vector, a target feature vector, and the like.

The hyperparameters include several parameters, such as initial values of the model parameters, required to be set initially for the learning. In addition, the model parameters include various parameters to be determined through the learning.

For example, the hyperparameters may include an initial weight between nodes, an initial bias between the nodes, a mini-batch size, the number of learning repetitions, a learning rate, and the like. In addition, the model parameters may include weight between the nodes, bias between the nodes, and the like. The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function. The loss function may mainly use a mean squared error (MSE) or cross entropy error (CEE), and the embodiments are not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

At this time, the step size may denote a learning rate.

The Gradient Descent may acquire a slope by partially differentiating the loss function by each of the model parameters, and update the learning parameters changing the learning parameters by the learning rate in the acquired slope direction.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

The artificial intelligence model according to the embodiments may be a neural network trained using images of various training objects and type information labeled on each of the images of the various training objects.

A method of training the neural network to predict the type information of the object will be described with reference to FIG. 6.

The learning device 200 may train a neural network 610 by labeling the type information of the training object onto training data including an image obtained by photographing the training object.

Specifically, the learning device 200 may train the neural network by using the image of the photographed training object as an input value and using the type information of the training object as an output value.

The type information may be a correct answer required to be inferred by the neural network by using the image of the photographed object.

Accordingly, the learning device 200 may label labeling data including the type information of the training object onto the training data including the image of the photographed training object so that the labeled labeling data may be provided to the neural network.

In this case, the neural network may infer a function for correlation between the image of the photographed training object and the type information by using the training data and the labeling data. In addition, the parameter (such as weight and bias) of the neural network may be determined (optimized) by evaluating the function inferred from the neural network.

Meanwhile, the learning device 200 may train the neural network 610 by using images obtained by photographing various types of training objects.

For example, the learning device 200 may train the neural network 610 by labeling an image obtained by photographing a bed as type information (bed) corresponding to the image.

In addition, the learning device 200 may train the neural network 610 by labeling an image obtained by photographing a chair as type information (chair) corresponding to the image.

In addition, the learning device 200 may train the neural network 610 by labeling an image obtained by photographing a table as type information (table) corresponding to the image.

In addition, the learning device 200 may train the neural network 610 by labeling an image obtained by photographing a sofa as type information (sofa) corresponding to the image.

Meanwhile, the learning device 200 may train the neural network 610 by using images of various objects classified into one type.

For example, the learning device 200 may train the neural network 610 by labeling images obtained by photographing various beds as type information for beds.

For another example, the learning device 200 may train the neural network 610 by labeling images obtained by photographing various chairs as type information for chairs.

For example, the learning device 200 may train the neural network 610 by labeling images obtained by photographing various tables as type information for tables.

For example, the learning device 200 may train the neural network 610 by labeling images obtained by photographing various sofas as type information for sofas.

The neural network trained in the above manner may be referred to as an artificial intelligence model.

The neural network constituting the artificial intelligence model may be a convolution neural network (CNN).

A first part Cony of the CNN may be configured as a convolution layer for analyzing and extracting a feature for an image, and a second half FC may be configured as a layer having a fully-connected shape to identify the object by using the extracted feature for the image. In the artificial intelligence model before mounted on the artificial intelligence moving agent, a parameter (at least one of weight or bias) of the artificial intelligence model may be determined by the training object.

Specifically, the artificial intelligence model before mounted on the artificial intelligence moving agent may extract a feature vector for the training object. The feature vector may indicate an illuminance of the image, a shape of the object, a color of the object, a position of the object, a relationship between the object and a background, or the like.

In addition, the artificial intelligence model may output (classify) the type information of the training object by using the feature vector extracted from the training object.

In addition, the parameter of the artificial intelligence model may be set by using a result value corresponding to the training object outputted (classified) by the artificial intelligence model and using the type information labeled on the training object.

Specifically, the learning device 200 may set the parameter of the artificial intelligence model to minimize a loss function value between the result value corresponding to the training object outputted (classified) by the artificial intelligence model and the type information labeled on the training object.

Meanwhile, the artificial intelligence model may be mounted on the artificial intelligence moving agent.

Specifically, the artificial intelligence model may be implemented in hardware, software or a combination of hardware and software. In addition, when the artificial intelligence model is partially or entirely implemented in the software, at least one instruction constituting the artificial intelligence model may be stored in a memory 170 of the artificial intelligence moving agent.

Figure 7:
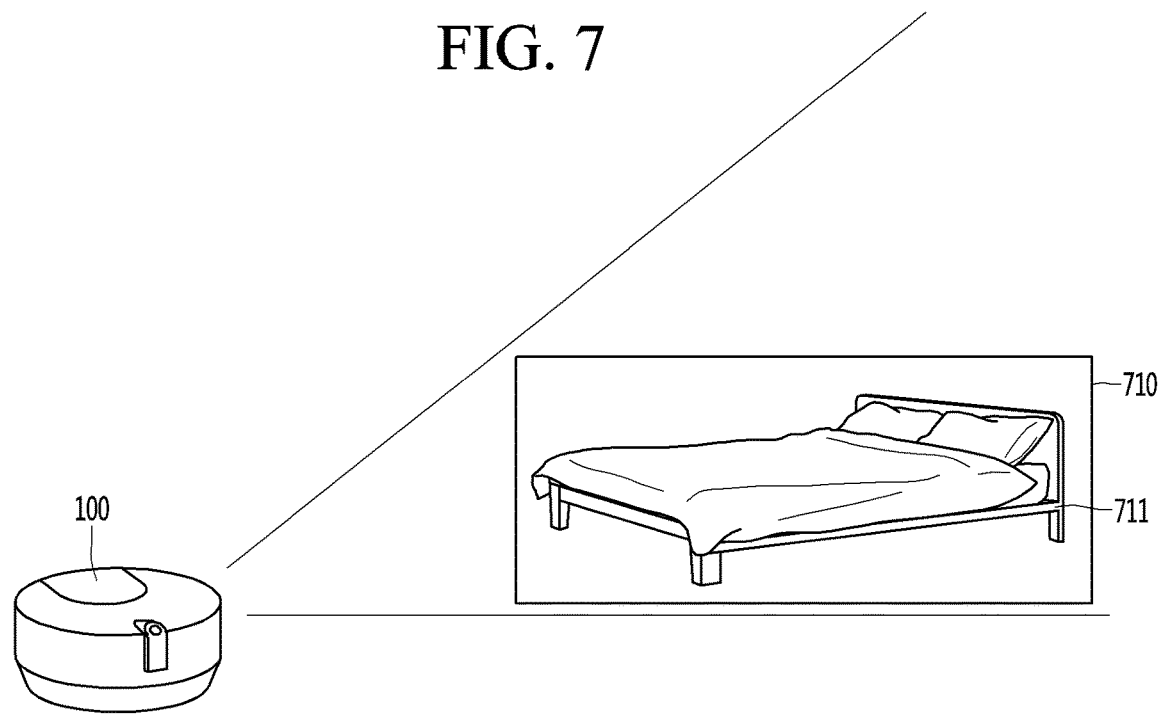
FIGS. 7 and 8 are views describing a method of acquiring type information of an object by photographing the object and by using an image obtained by photographing the object, according to the embodiments.
Figure 8:
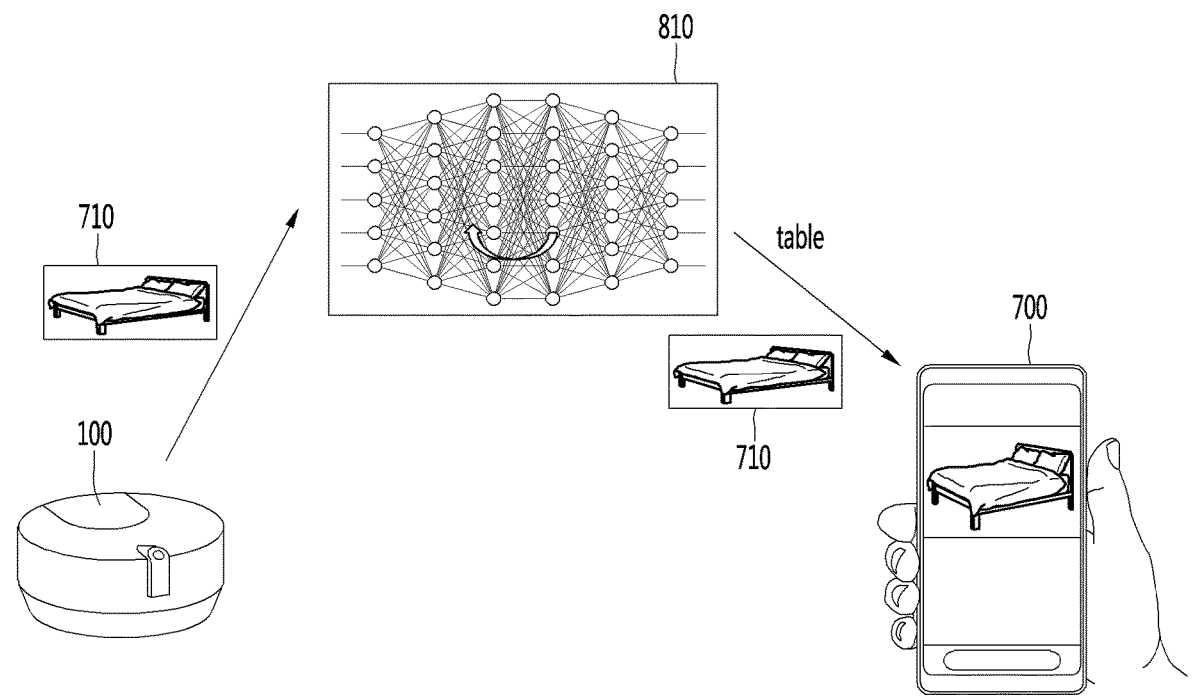

FIGS. 7 and 8 are views describing a method of acquiring type information of an object by photographing the object and by using an image obtained by photographing the object according to the embodiments.

The processor 180 may control the artificial intelligence moving agent to move in the indoor space.

In addition, the processor 180 may acquire type information of the object by controlling the camera to photograph the object and providing an image 710 obtained by photographing the object 711 to the artificial intelligence model 810.

Specifically, when the image 710 obtained by photographing the object 711 is inputted, the artificial intelligence model may output (classify) a result value, particularly, the type information of the object.

For example, when an image obtained by photographing a bed is inputted, the artificial intelligence model may output a correct answer indicating that the object in the inputted image is a bed.

For another example, when an image obtained by photographing a bed is inputted, the artificial intelligence model may output an incorrect answer indicating that the object in the inputted image is a table.

Meanwhile, the processor may acquire correction type information designated by the user with respect to the image obtained by photographing the object.

Specifically, the communication unit may communicate with a terminal of the user.

In addition, the processor may transmit the image of the photographed object and the type information of the object outputted by the artificial intelligence model to a terminal 700 of the user.

For example, when the artificial intelligence model outputs an incorrect answer indicating that the object in the image is a table, the processor may transmit the image of the bed and the type information as a table to the terminal 700 of the user.

Meanwhile, the processor 180 may store the image obtained by photographing the object in the memory. In this case, the processor may store the image by using an image compression technique for efficiency of a storage space, and a security policy may be applied to the storage space for storing the image so as to protect personal information.

Meanwhile, the processor may transmit identification information corresponding to the image of the photographed object to the terminal, together with the image of the object and the type information of the object.

For example, the processor may transmit a first image and first identification information corresponding to the first image to the terminal.

In addition, the processor may transmit a second image and second identification information corresponding to the second image to the terminal.

Figure 9:
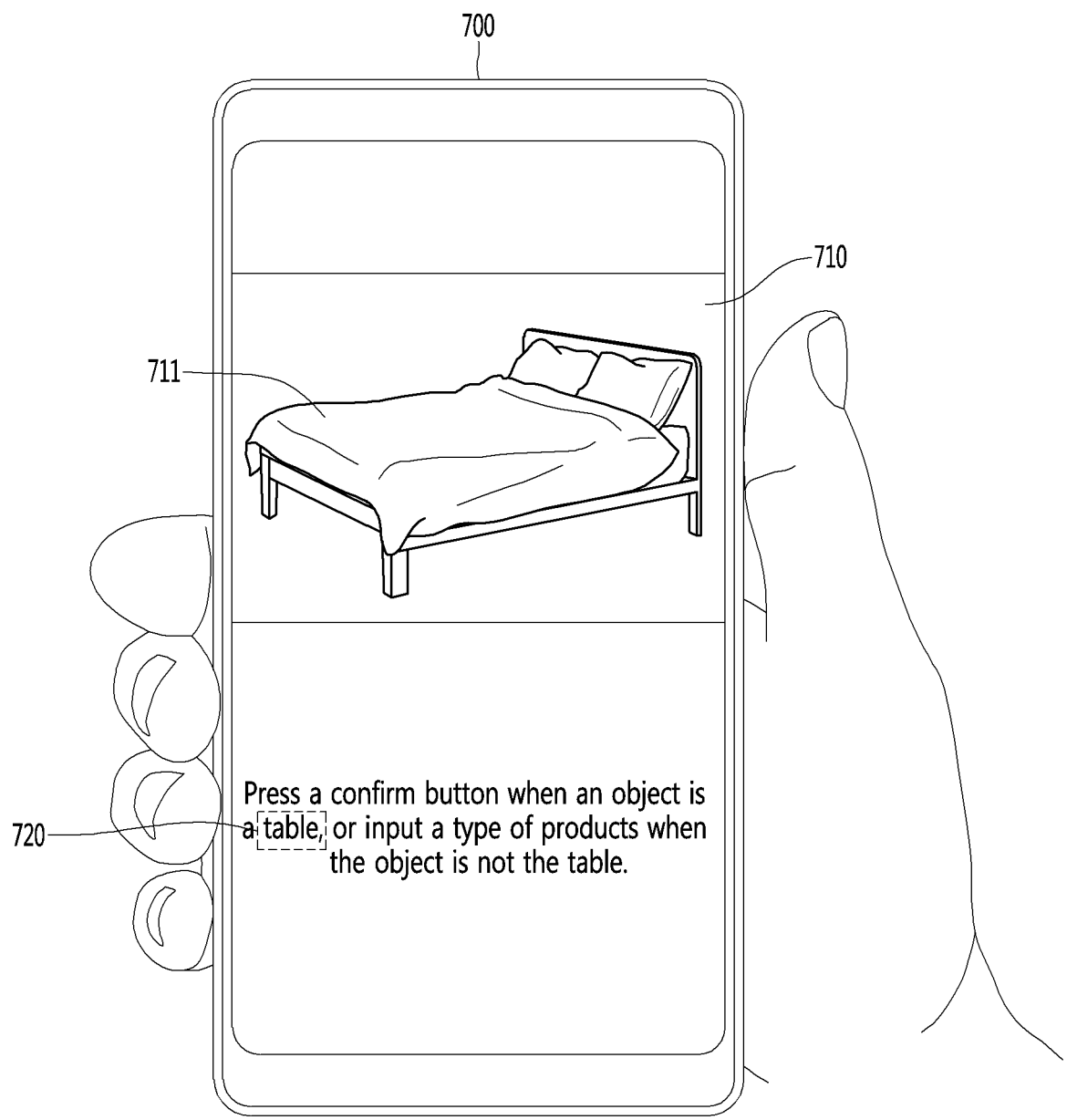
FIG. 9 is a view describing a method of receiving correction type information according to the embodiments.

FIG. 9 is a view describing a method of receiving correction type information according to the embodiments.

The terminal 700 may include the configuration of the AI device 100 described with reference to FIG. 1, and may perform functions corresponding to the configuration.

Referring to FIG. 9, the processor of the terminal 700 may receive the image of the photographed object and the type information of the object through the communication unit.

In this case, the processor of the terminal may display an image 710 of the photographed object. In addition, the processor of the terminal may display type information 720 of the object together with the image 710 of the photographed object.

Meanwhile, the processor of the terminal may generate a feedback based on an input of the user and transmit the feedback to the artificial intelligence moving agent.

The feedback may include correct answer information indicating that the type information outputted (classified) by the artificial intelligence model is a correct answer.

Specifically, the processor of the terminal may receive an input, from the user, indicating that the type information outputted (classified) by the artificial intelligence model is a correct answer.

In this case, the processor of the terminal may generate correct answer information and transmit the correct answer information to the artificial intelligence moving agent.

Meanwhile, the feedback may include the correction type information. The correction type information may be type information designated by the user with respect to the image of the photographed object.

For example, when the object 711 in the image 710 is a bed whereas the type information outputted (classified) by the artificial intelligence model is a table, the user may provide an input for designating that the object 711 is a bed to the terminal.

In this case, the processor of the terminal may receive, through an input unit, the correction type information (bed) designated by the user with respect to the image of the photographed object.

In addition, the processor of the terminal may transmit the correction type information to the terminal.

Meanwhile, the processor of the terminal may transmit the identification information of the image 711 of the photographed object to the artificial intelligence moving agent, together with the feedback (the correct answer information or correction type information).

For example, when it is assumed that identification information of the first image, together with the first image of the photographing object, is received from the moving agent, the processor may generate a feedback corresponding to the first image, and transmit the identification information corresponding to the first image together with the generated feedback.

Meanwhile, the processor 180 of the moving agent 100 may receive the feedback from the terminal 700 and may train the artificial intelligence model 810 by using the received feedback.

Figure 10:
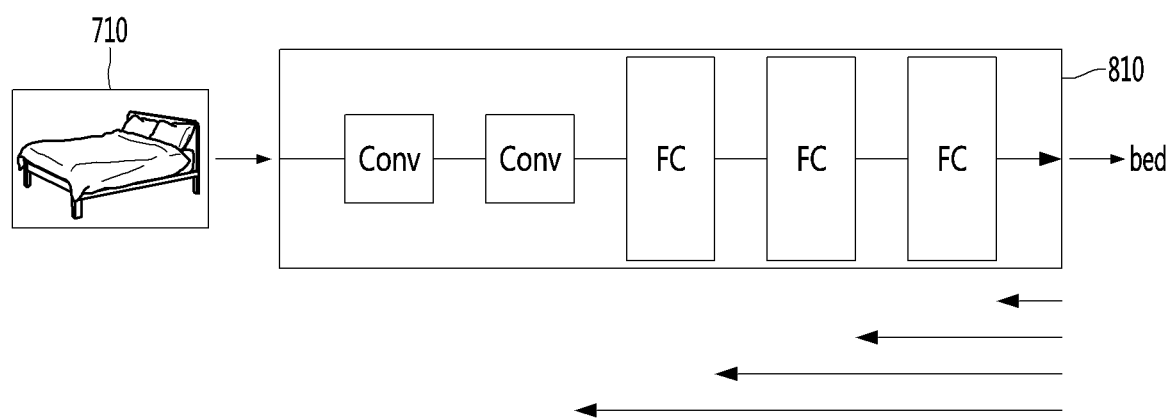
FIG. 10 is a view describing a method of training an artificial intelligence model 810 by using a received feedback.

FIG. 10 is a view describing a method of training the artificial intelligence model 810 by using a received feedback.

The processor 180 may train the artificial intelligence model by using the feedback.

First, a method of training the artificial intelligence model in the case that the feedback is correction type information will be described.

The processor 180 may train the artificial intelligence model by using the correction type information.

Specifically, the processor may train the artificial intelligence model 810 by using the image 710 of the photographed object and the correction type information labeled on the image 710 of the photographed object.

More specifically, the processor may train the artificial intelligence model 810 by using the image 710 of the photographed object as an input value and using the correction type information as an output value.

The correction type information may be a correct answer required to be inferred by the artificial intelligence model 810 by using the image 710 of the photographed object.

In this case, the artificial intelligence model 810 may infer a function for correlation between the image 710 of the photographed object and the correction type information by using the image 710 of the photographed object and the correction type information.

In addition, the parameter (such as weight and bias) of the artificial intelligence model may be determined (optimized) by evaluating the function inferred from the artificial intelligence model 810.

Meanwhile, in the artificial intelligence model after mounted on the artificial intelligence moving agent, a parameter (at least one of weight or bias) of the artificial intelligence model may be determined by the object in the indoor space in which the artificial intelligence moving agent is active.

Specifically, the artificial intelligence model after mounted on the artificial intelligence moving agent may extract a feature vector of the object photographed in the indoor space. The feature vector may indicate an illuminance of the image, a shape of the object, a color of the object, a position of the object, a relationship between the object and a background, or the like.

In addition, the artificial intelligence model after mounted on the artificial intelligence moving agent may output a result value (a recognition result) corresponding to the object in the indoor space by using the feature vector extracted from the object in the indoor space.

In addition, the parameter of the artificial intelligence model may be set using the result value, which is outputted (classified) by the artificial intelligence model, and the correction type information.

Specifically, the processor may set the parameter of the artificial intelligence model to minimize a loss function value between the result value outputted by the artificial intelligence model and the correction type information.

Meanwhile, when the artificial intelligence moving agent receives the identification information together with the feedback, the processor may train the artificial intelligence model by using an image designated by the received identification information.

Specifically, when the artificial intelligence model to which the first image is inputted outputs a first result value including first type information, the processor 180 may transmit the first image, the first type information, and the first identification information corresponding to the first image to the terminal. In this case, the processor may store the first image and the first identification information in the memory.

In addition, when first correction type information and the first identification information are received from the terminal, the processor 180 may train the artificial intelligence model 810 by using the first image corresponding to the first identification information and the first correction type information.

Meanwhile, when the artificial intelligence model 810 is trained, the image 710 of the photographed object is not necessarily inputted again.

Specifically, when the artificial intelligence model 810 outputs the result value, the processor may store the result value in the memory. In addition, when the correction type information is received from the terminal of the user, the processor may train the artificial intelligence model 810 by using the result value stored in the memory and the correction type information received from the terminal. In this case, the processor may set the parameter of the artificial intelligence model to minimize a loss function value between the result value outputted by the artificial intelligence model and the correction type information.

Meanwhile, when the artificial intelligence moving agent receives the identification information together with the feedback, the processor may train the artificial intelligence model by using the result value designated by the received identification information.

Specifically, when the artificial intelligence model to which the first image is inputted outputs a first result value including first type information, the processor 180 may transmit the first image, the first result value, and the first identification information corresponding to the first image to the terminal. In this case, the processor may store the first result value and the first identification information in the memory.

In addition, when first correction type information and the first identification information are received from the terminal, the processor 180 may train the artificial intelligence model 810 by using the first result value corresponding to the first identification information and the first correction type information.

Next, a method of training the artificial intelligence model in the case that the feedback is correct answer information will be described.

Although the artificial intelligence model outputs a correct answer, the object in the indoor space may be different from the training object. Accordingly, when the image of the object in the indoor space is inputted, a confidence score of the correct answer outputted by the artificial intelligence model may be lower than a confidence score of the correct answer outputted by the artificial intelligence model when the image of the training object is inputted.

Accordingly, when the correct answer information is received, the processor 180 may train the artificial intelligence model by using the type information outputted by the artificial intelligence model.

Specifically, the processor may train the artificial intelligence model 810 by using the image 710 of the photographed object and the type information labeled on the image 710 of the photographed object. The type information labeled on the image 710 of the photographed object may be type information outputted by the artificial intelligence model when the image 710 of the photographed object is inputted.

In this case, the artificial intelligence model 810 may infer a function for correlation between the image 710 of the photographed object and the type information by using the image 710 of the photographed object and the type information.

In addition, the parameter (such as weight and bias) of the artificial intelligence model may be determined (optimized) by evaluating the function inferred from the artificial intelligence model 810.

Meanwhile, the artificial intelligence model 810 is composed of a plurality of layers. In addition, a layer targeted for correction of the parameter may be a part or all of the neural network. In addition, the number of the layer targeted for correction of the parameter may vary according to the number of images that are photographed by the artificial intelligence moving agent and used for training.

Meanwhile, the processor may generate a plurality of images including the object by using the image of the photographed object, and may train the artificial intelligence model by using the generated images and the correction type information.

Specifically, the processor may generate a plurality of images obtained by applying various lightings or viewpoints to the image of the photographed object. In this case, the images may include the same object but may have illuminance, color, brightness, saturation, viewpoint and the like different from those of the photographed image. In addition, the processor may train the artificial intelligence model by using the generated images and the correction type information.

Meanwhile, after the artificial intelligence model is trained, the moving agent may move in the indoor space. In addition, the processor may photograph the object to acquire a second image of the photographed object.

In this case, the processor may provide the second image of the photographed object to the trained artificial intelligence model, and may acquire correction type information outputted by the trained artificial intelligence model.

Specifically, the trained artificial intelligence model is trained using the image of the photographed object and the correction type information corresponding to the object, and thus the parameter is in an updated state. Accordingly, the trained artificial intelligence model may extract the feature vector from the image of the photographed object based on the updated parameter, and may classify the object by using the extracted feature vector. Accordingly, the trained artificial intelligence model may output an accurate result value, that is, correction type information for the second image of the photograph object.

In addition, the artificial intelligence moving agent may evolve while performing the above process continuously.

When an object to learn in advance is different from an object existing in the indoor space, the performance of object recognition by the artificial intelligence model may be lowered. However, since the artificial intelligence moving agent according to the embodiments additionally trains the artificial intelligence model by using an object that actually exists in the indoor space, the performance of object recognition by the artificial intelligence model can be improved and a personalized artificial intelligence model can be provided.

Meanwhile, the processor may store a learning result in the memory. The learning result may include the parameter of the trained artificial intelligence model. Meanwhile, the processor may perform the object recognition with respect to an object by using the parameter of the trained artificial intelligence model.

In one embodiment, the memory may store entire parameters of the artificial intelligence model. The entire parameters of the artificial intelligence model may be initial parameters (parameters of the artificial intelligence model set before the artificial intelligence model is mounted on the artificial intelligence moving agent).

In addition, when the training of the artificial intelligence model is completed, a part of the entire parameters may be changed into new parameters.

In this case, the processor may newly store the entire parameters, which are partially changed into the new parameters, in the memory, and the object recognition may be performed by using an artificial intelligence model set with the newly stored entire parameters.

In another embodiment, the memory may store personalization parameters of the artificial intelligence model.

In addition, when the training of the artificial intelligence model is completed, the personalization parameters may be changed into new parameters. In addition, the processor may newly store the changed personalization parameters in the memory.

Meanwhile, the processor may receive the initial parameters of the artificial intelligence model from the server, correct a part of the received initial parameters by using the personalization parameters stored in the memory, or add the personalization parameters to the received initial parameters.

In addition, the processor may perform the object recognition by using the artificial intelligence model set with the initial parameter corrected by the personalization parameter or the initial parameter to which the personalization parameters are added.

FIG. 11 is a view describing a condition for transmitting the image obtained by photographing the object and type information of the object, according to the embodiments.

The artificial intelligence model may output a result value. The result value may include the type information and the confidence score of the object.

For example, it is assumed that an image obtained by photographing a bed is inputted to the artificial intelligence model.

In this case, as shown in FIG. 11a, the artificial intelligence model 810 may output a result value including a bed and a confidence score of 90%. In other words, the artificial intelligence model 810 may output a correct answer and a high confidence score.

In addition, as shown in FIG. 11b, the artificial intelligence model 810 may output a result value including a bed and a confidence score of 50%. In other words, the artificial intelligence model 810 may output a correct answer and a low confidence score.

In addition, as shown in FIG. 11c, the artificial intelligence model 810 may output a result value including a table and a confidence score of 40%. In other words, the artificial intelligence model 810 may output an incorrect answer, and generally output a low confidence score when the artificial intelligence model outputs the incorrect answer.

Meanwhile, when the artificial intelligence model 810 may output the low confidence score (the artificial intelligence model outputs the correct answer but the confidence score is low, or the confidence score is low because the artificial intelligence model outputs an incorrect answer), additional learning is required.

Accordingly, when the confidence score is lower than a preset value, the processor may transmit the image of the photographed object and the type information of the object to the terminal.

For example, when the confidence score is 50% or less, the processor may transmit the image of the photographed object and the type information of the object to the terminal.

Therefore, according to the embodiments the additional training is performed only on an object that requires the additional training, so that communication traffic, data throughput, and memory usage can be saved.

Figure 12:
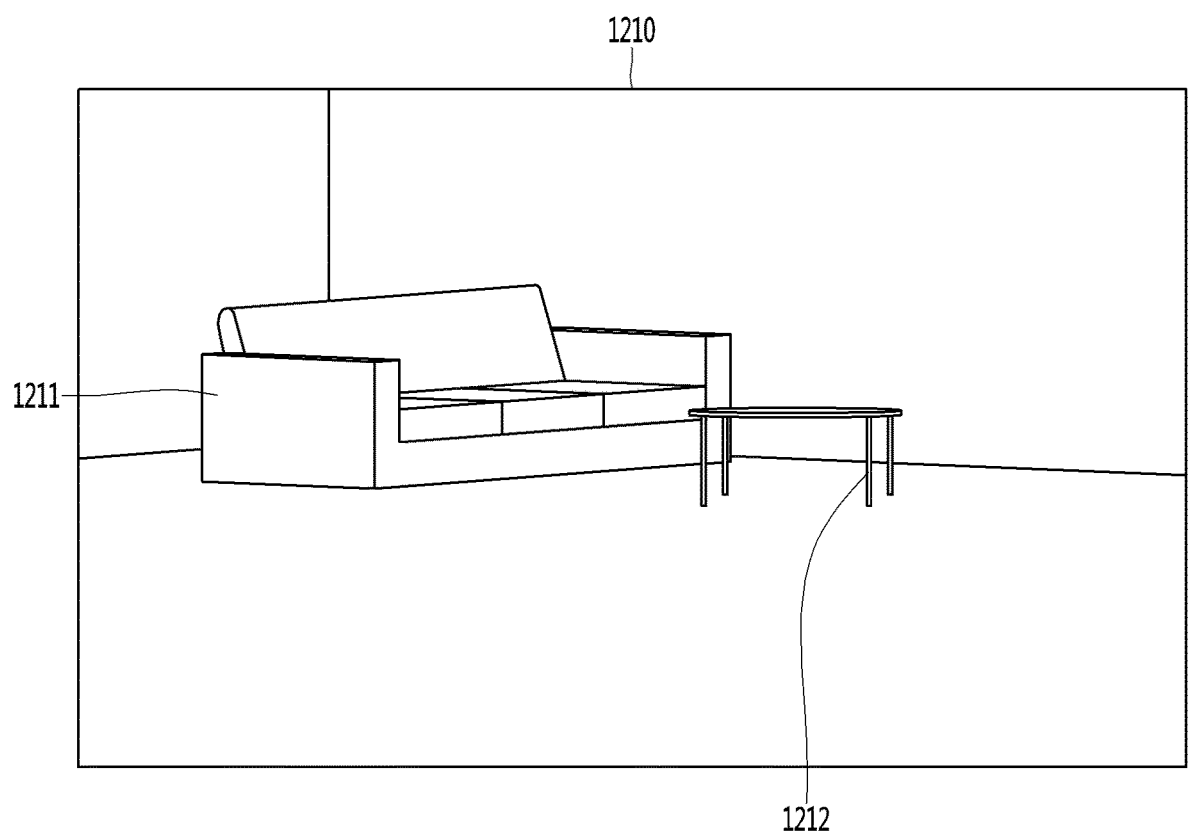
FIGS. 12 and 13 are views describing a situation of re-training the artificial intelligence model by using a feedback, according to the embodiments.
Figure 13:
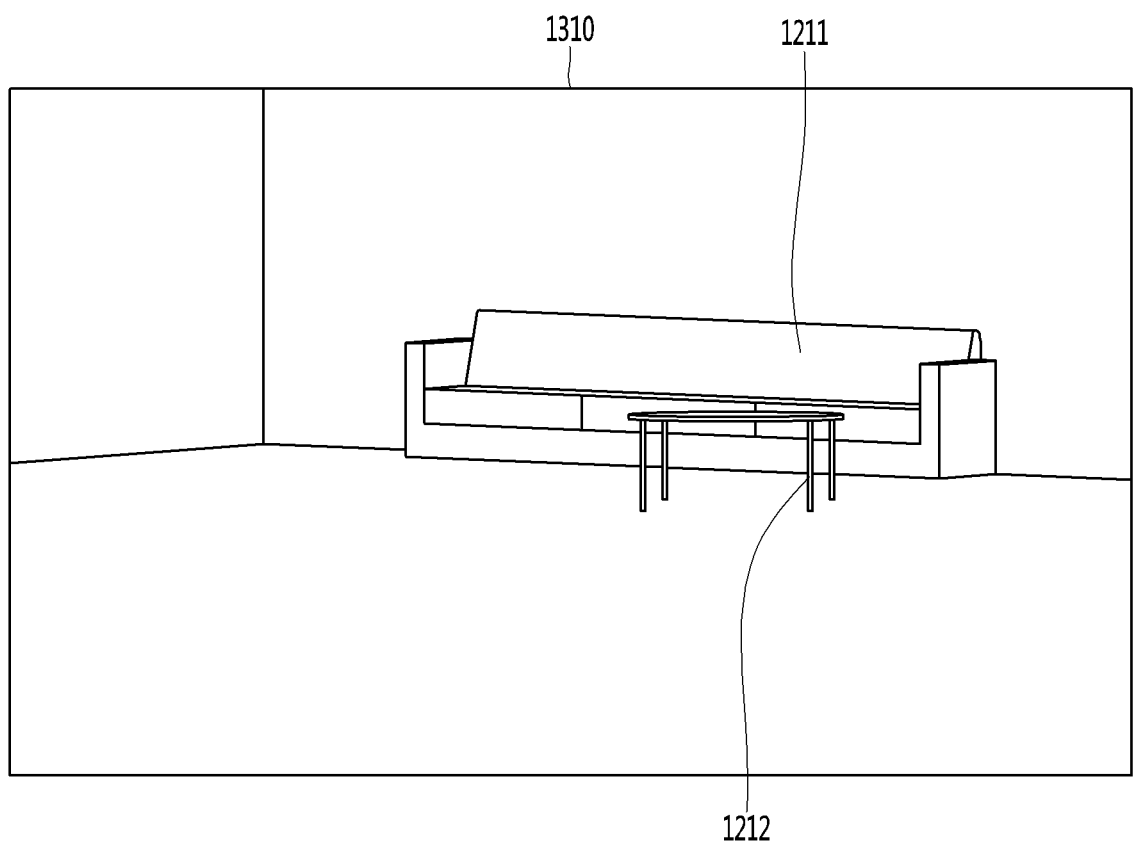

FIGS. 12 and 13 are views describing a situation of re-training the artificial intelligence model by using a feedback, according to the embodiments.

The processor may store result values for at least one object 1211 and 1212 in a specific space into the memory.

For example, when a first object 1211 and a second object 1212 exist in the specific space, the processor may input a photographed image of the first object 1211 and a photographed image of the second object 1212 into the artificial intelligence model, and may acquire a first result value (type information of the first object 1211 or type information and confidence score of the first object 1211) corresponding to the photographed image of the first object 1211, and a second result value (type information of the second object 1212 or type information and confidence score of the second object 1212) corresponding to the photographed image of the second object 1212.

In this case, the processor may store result values for at least one object in the specific space into the memory. For example, the processor may store the first result value and the second result value in the memory.

Meanwhile, as shown in FIG. 13, there may be situations that the arrangement of the first object 1211 is changed, a new object is added, (for example, a chair is newly arranged in a specific space), or an existing object is changed (for example, one table is changed to another table).

In addition, the above situations are situations that may change the recognition performance of the artificial intelligence model (that is, the situations that may change the result values), and some of the situations may cause the artificial intelligence model to output an incorrect answer.

Accordingly, the processor may determine whether the result values for at least one object in the specific space are changed.

The change of the result values may signify that a new result value is added (that is, a new object is added), an existing result value is changed (for example, an existing table is changed to another table, or the arrangement of a sofa is changed).

In addition, when the result value is changed, the processor may re-train the trained artificial intelligence model.

Specifically, when the result value is changed, the processor may transmit the image obtained by photographing the at least one object existing in the specific space to the terminal. The image obtained by photographing the at least one object existing in the specific space may be an image after the specific space is changed.

In addition, the trained artificial intelligence model may be re-trained by using a feedback received from the terminal.

The feedback may include the correction type information.

Specifically, when the result value is changed, the processor may transmit the type information of the at least one object existing in the specific space together with the image obtained by photographing the at least one object existing in the specific space.

In addition, the processor may receive correction type information designated by the user with respect to some or all of the at least one object existing in the specific space.

In this case, the processor may re-train the artificial intelligence model by using the correction type information.

In addition, the feedback may include new type information.

Specifically, when the result value is changed, the processor may transmit the image obtained by photographing the at least one object existing in the specific space to the terminal.

In this case, the processor of the terminal may receive, from the user, the new type information that newly designates type information for some or all of the at least one object. In addition, the processor of the terminal may transmit the new type information to the terminal.

In this case, the processor may receive the new type information, and may re-train the artificial intelligence model by using the received new type information.

For example, when a third object (chair) is newly added to the specific space, the processor may transmit an image of the indoor space, into which the third object (chair) is newly added, to the terminal. In this case, the user may designate new type information for the third object as a "chair". In this case, the terminal may transmit the new type information as the "chair" to the artificial intelligence moving agent, and the processor of the artificial intelligence moving agent may re-train the trained artificial intelligence model by labeling the "chair" on the image of the third object.

The embodiments described above may be implemented as computer-readable code in a medium on which a program is recorded. The computer-readable medium includes all kinds of recording devices for storing data readable by a computer system. Examples of the computer-readable media include a hard disk drive (HDD), a solid state disk (SSD), a silicon disk drives (SDD), a ROM, a RAM, a CD-ROM, a magnetic tape, a floppy disk, an optical data storage device, and the like. In addition, the computer may include the controller 180 of the terminal. Accordingly, the above detailed description should not be construed as limiting in all aspects, but should be considered as illustrative. The scope of the embodiments should be determined by reasonable interpretation of the appended claims, and all modifications within the equivalent scope of the embodiments are included in the scope of the embodiments.

What is claimed is:

1. An artificial intelligence moving agent comprising:
a camera;
a memory configured to store data; and
a processor configured to:
cause the camera to capture an image of an object,
acquire type information of the object by providing, to an artificial intelligence model, the image captured by the camera, wherein the artificial intelligence model outputs a result value including the type information of the object and a confidence score of the object, and
based on the confidence score of the object being lower than a preset value,
acquire a corrected type information with respect to the image, wherein the corrected type information is acquired by transmitting, to a terminal of a user, the image and the type information of the object and receiving, from the terminal, the corrected type information labeled by a user with respect to the image, and
train the artificial intelligence model by using the image and the corrected type information labeled by the user,
wherein the processor is further configured to:
store a result value for at least one object existing in a specific space of the image in the memory, and
re-train the trained artificial intelligence model by transmitting an additional image obtained by capturing the additional image of the at least one object existing in the specific space of the image to the terminal based on a determination that the result value has changed,
wherein the trained artificial intelligence model is further re-trained by using a feedback received from the terminal.

2. The artificial intelligence moving agent according to claim 1, wherein the artificial intelligence model includes a neural network trained using images of various training objects and type information labeled on each of the images of the various training objects.

3. The artificial intelligence moving agent according to claim 1, wherein, before the artificial intelligence model is coupled on the artificial intelligence moving agent, the artificial intelligence model extracts a feature vector for a training object, outputs a result value corresponding to the training object by using the feature vector extracted from the training object, and sets a parameter by using the result value corresponding to the training object and type information labeled on the training object; and wherein, after the artificial intelligence model is coupled on the artificial intelligence moving agent, the artificial intelligence model extracts a feature vector for the object, outputs a result value corresponding to the object by using the feature vector extracted from the object, and sets a parameter by using the result value corresponding to the object and the corrected type information.

4. The artificial intelligence moving agent according to claim 1, wherein the processor is further configured to: provide, to the trained artificial intelligence model, a second image of the object captured by the camera, and acquire the corrected type information outputted by the trained artificial intelligence model.

5. A method of operating an artificial intelligence moving agent, the method comprising:
    capturing an image of an object;
    acquiring type information of the object by providing to an artificial intelligence model, the image, wherein the artificial intelligence model outputs a result value including the type information of the object and a confidence score of the object; and
    based on the confidence score of the object being lower than a preset value,
    acquiring a corrected type information with respect to the image, wherein the corrected type information is acquired by transmitting, to a terminal of a user, the image and the type information of the object and receiving, from the terminal, the corrected type information labeled by a user with respect to the image;
    training the artificial intelligence model by using the image and the corrected type information labeled by the user;
    store a result value for at least one object existing in a specific space of the image in a memory; and
    re-train the trained artificial intelligence model by transmitting an additional image obtained by capturing the additional image of the at least one object existing in the specific space of the image to the terminal based on a determination that the result value has changed, wherein the trained artificial intelligence model is further re-trained by using a feedback received from the terminal.

6. The method according to claim 5, wherein the artificial intelligence model includes a neural network trained using images of various training objects and type information labeled on each of the images of the various training objects.

7. The method according to claim 5, wherein, before the artificial intelligence model is coupled on the artificial intelligence moving agent, the artificial intelligence model extracts a feature vector for a training object, outputs a result value corresponding to the training object by using the feature vector extracted from the training object, and sets a parameter by using the result value corresponding to the training object and type information labeled on the training object; and, after the artificial intelligence model is coupled on the artificial intelligence moving agent, the artificial intelligence model extracts a feature vector for the object, outputs a result value corresponding to the object using the feature vector extracted from the object, and sets a parameter using the result value corresponding to the object and the corrected type information.

8. The method according to claim 7, further comprising:
    providing a second image obtained by photographing the object to the trained artificial intelligence model, and acquiring the corrected type information outputted by the trained artificial intelligence model.

* * * * *